Sept. 18, 1945.   L. H. GARLINGHOUSE   2,384,992
SPLICING RIG
Filed Jan. 17, 1945     2 Sheets-Sheet 2
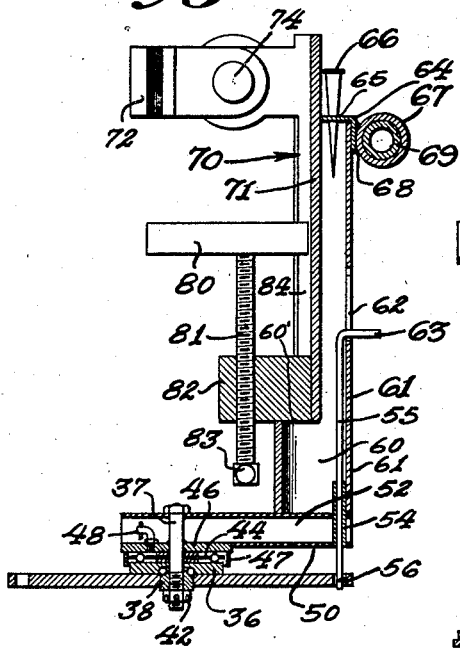
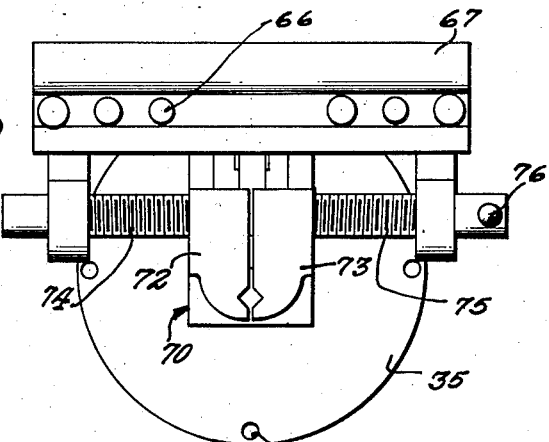
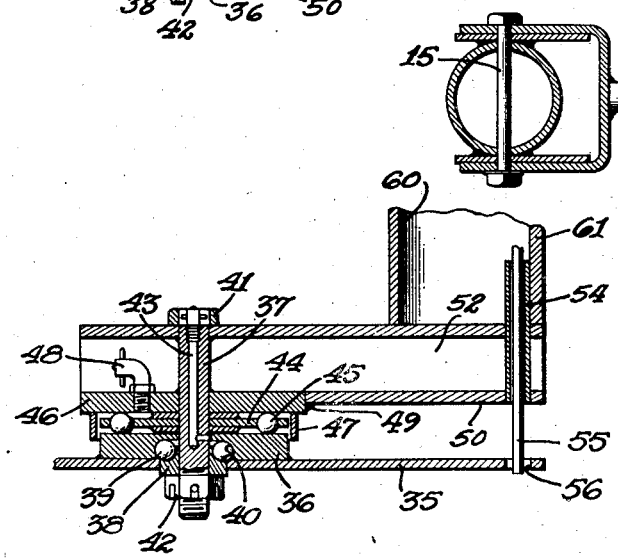
L. H. GARLINGHOUSE
INVENTOR.
BY
ATTORNEY Patented Sept. 18, 1945

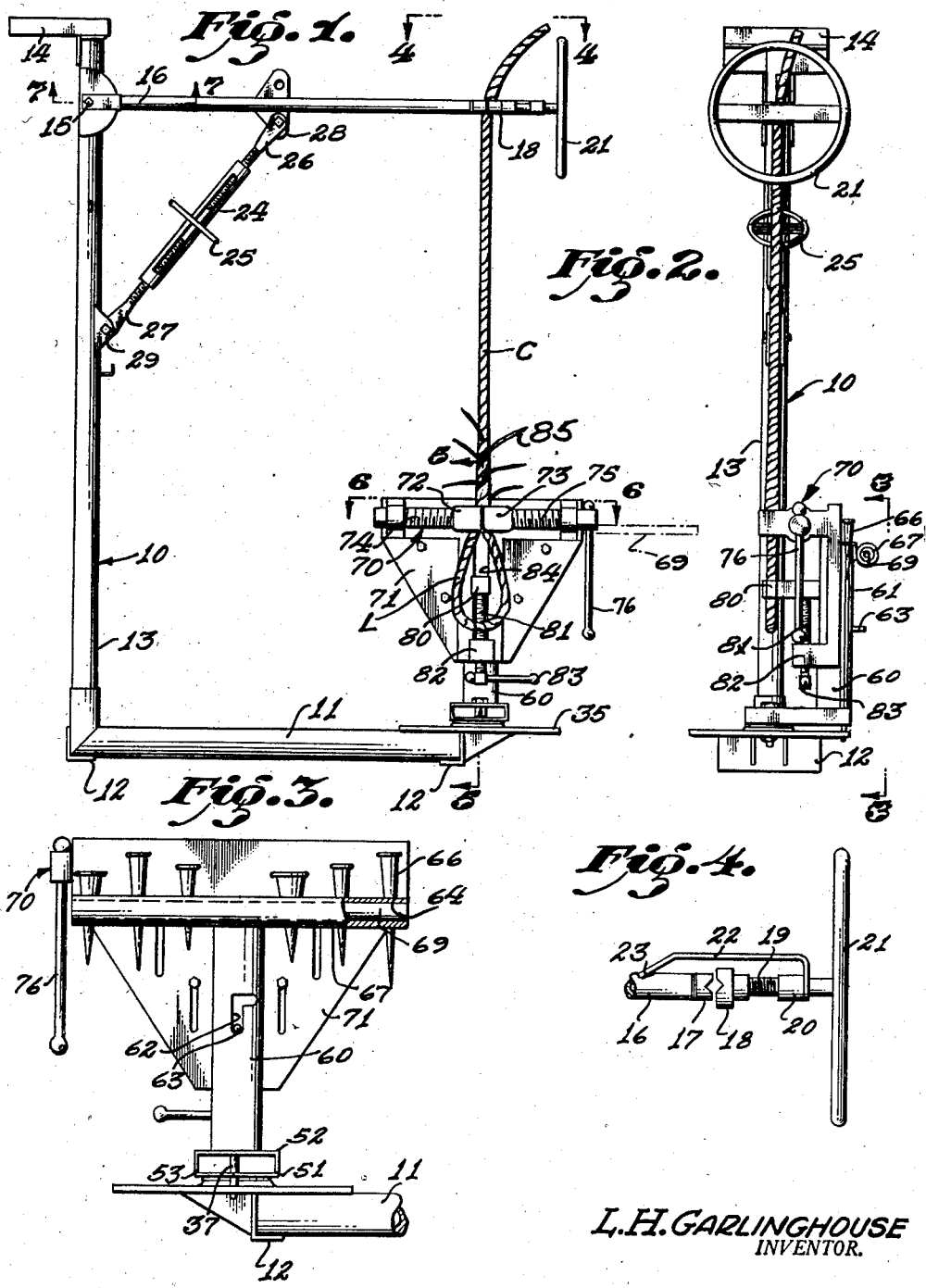

2,384,992

UNITED STATES PATENT OFFICE 2,384,992

SPLICING RIG

Leslie H. Garlinghouse, Los Angeles, Calif.

Application January 17, 1945, Serial No. 573,299

4 Claims. (Cl. 57—23)

This invention relates to splicing rigs.

The general object of the invention is to provide a portable, self-contained splicing apparatus which includes all the necessary mechanisms in their properly related positions and which provides the mechanisms with an easy method of operation to make splicing a cable easy for an operator.

A more specific object of the invention is to provide an improved splicing rig which will permit the ready splicing of the end of a cable for the purpose of joining two cables or for the purpose of making a loop in the end of a cable.

In splicing cables, which are made of a number of tightly twisted strands of wire, it is necessary to untwist a portion to form gaps in the cable to permit untwisted end portions of the cable to be run through the gaps. Thereafter the strands are twisted back to their normal position and the splice is made.

It is one of the specific objects of my invention to provide a novel unit including a support member for holding both the ends of the cable which are being worked upon and the remainder of the cable.

A further object of the invention is to provide a cable splicing rig including a novel supporting arm for the cable.

A further object of the invention is to provide a novel means for clamping a cable on a splicing rig.

Another object of the invention is to provide a novel mounting for the clamping means of a cable splicing rig.

A further object of the invention is to provide a novel standard for a cable splicing rig.

Other objects and advantages of the invention will be apparent from the following description taken in connection with the accompanying drawings, wherein:

Fig. 1 is a side elevation showing a cable splicing rig embodying the features of my invention;

Fig. 2 is a front view of the rig;

Fig. 3 is a fragmentary side elevation looking in the direction of the arrows 3—3, Fig. 1;

Fig. 4 is a fragmentary plan view looking in the direction of the arrows 4—4, Fig. 1;

Fig. 5 is an enlarged section taken on line 5—5, Fig. 1;

Fig. 6 is a top plan view taken on line 6—6, Fig. 1;

Fig. 7 is a fragmentary section taken on line 7—7, Fig. 1, and

Fig. 8 is an enlarged sectional view showing the mounting means for the base.

Referring to the drawings by reference characters, I have shown my invention as embodied in a cable splicing rig which is indicated generally as at 10. As shown, the rig includes a base member 11 which has pads 12 secured thereto, allowing the apparatus to be supported. An upright member 13 is supported by the base and extends at right angles thereto. The upright includes a pad 14 which serves to support the rig. The apparatus may be supported in a vertical position as shown in Fig. 1 with the pads 12 resting upon a base and the pad 14 secured upon a support or the apparatus may be mounted with the member 13 horizontal as the worker may prefer.

Pivotally mounted on the upright 13, as at 15, I show a gripping vise arm 16. The gripping vise arm has a vise jaw 18 which is mounted to rotate on a threaded member 19 which passes through a nut 20 and is operated by a hand wheel 21. A bracket 22, welded as at 23 to the arm 16, supports the nut 20.

When a cable is placed between the jaws 17 and 18 and the wheel 20 is rotated, the member 19 will thread through the nut 20 and will advance the jaw 18 towards the jaw 17 to hold the cable in position.

In order to raise the arm 16 and increase the tension on the cable after the latter has been engaged by a lower clamping means (to be later described), I provide an adjusting member 24 which has an operating wheel 25 thereon and which is reversely threaded at each end to threadedly receive eye members 26 and 27 which are pivoted to brackets 28 and 29 respectively. The bracket 28 is mounted on the arm 16 and the bracket 29 is mounted on the upright 13.

The base member 11 supports a table 35 which is fixed thereon. On the table 35 I arrange a support member 36 through which a shaft 37 extends. The lower end of the shaft 37 includes a bearing 38 which engages ball bearings 39 arranged in a raceway 40 on the support member 36. The shaft 37 includes a head 41 and a nut 42 for holding the parts assembled. The shaft 37 includes an oil slot 43 leading to the ball bearings 39.

Arranged about the shaft I show a ball retainer 44 which supports ball bearings 45. The balls 45 engage the support member 36 and also engage a plate 46 from which a dust guard 47 depends. A lubricating fitting 48 serves to supply lubricant to the balls 45. The plate 46 is secured as by welding at 49 to a plate 50 and both the plates 46 and the plate 50 are secured to the lower edges 51 of a channel member or vise base 52 by welding as at 53 (Fig. 3).

The construction is such that the vise base 52 is rotatably supported on the table 35. To hold the vise base 52 in position the base is provided with a tube 54 to which a rod 55 extends. The rod 55 enters any one of a plurality of holes 56 in the table 35 to hold the parts assembled.

Mounted on the base 52 I show a vise support which consists of an upright tube 60 which is cut away as at 60' and has a rear wall 61. The wall 61 has a slot 62 through which the bent end 63 of the rod 55 extends. The wall 61 includes a shelf 64 which is apertured as at 65 to receive splicing tools 66. The shelf also includes a tube 67 which is welded as at 68 to the shelf and which slidably receives a rod 69 which may be withdrawn to serve as a handle by means of which the vise support may be rotated.

Mounted upon the tube 60 I show a splicing vise, indicated generally as at 70. The vise includes a base 71 having jaws 72 and 73 thereon. The jaws 72 and 73 are mounted to rotate relative to threaded members 74 and 75, respectively. The threaded member 75 includes an operating bar 76, by means of which the jaw 73 may be moved towards the jaw 72 to hold the parts assembled during the splicing operation.

The base 71 includes an internally threaded portion 80 which receives a threaded member 81. This threaded member 81 has a slide member 82 thereon. The member 82 slides along the base 71 when rotated by an arm 83 and moves along ways 84.

In using my improved splicing rig, the operator opens the jaws 18 and 73, then runs a cable C through the jaw 18 and turns the wheel 21 to clamp the cable in place. The cable is brought back inside the jaw 73 and the operating bar 76 is then rotated to clamp the free end of the cable against the adjacent portion so that a loop L is formed. The slide member 82 serves to determine the size of the loop L. The operating wheel 25 may then be rotated to shift the arm 16 to make the cable taut. The rod 69 is then moved to shift the base 71 and unwind the cable so that the strands 85 of the free end may be inserted between the strands of the body portion of the cable to secure the splice. The necessary tools 66 may be removed from the shelf 64 for this purpose. The cable may then be twisted by swinging the rod 69 so that the cable assumes a normal position and thereafter the various vises are released and the cable removed.

From the foregoing description it will be apparent that I have invented a novel cable splicing apparatus which may be economically manufactured and which is highly efficient for its intended purpose.

Having thus described my invention, I claim:

1. A cable splicing rig including a base member, an upright mounted on said base member, a gripping vise arm pivoted on said upright and extending outwardly therefrom, means to support said arm in adjusted position relative to said upright, a fixed jaw member on said arm, a movable jaw member on said arm, means for operating the movable jaw, a vise stand, means to pivotally support said vise stand on said base member for rotation, a vise support on said vise stand, a splicing vise on said vise support, said splicing vise including a body having a fixed jaw and a movable jaw thereon, and means to move the splicing vise movable jaw.

2. A cable splicing rig including a base member, an upright mounted on said base member, a gripping vise arm pivoted on said upright and extending outwardly therefrom, means to support said arm in adjusted position relative to said upright, a fixed jaw member on said arm, a movable jaw member on said arm, means for operating the movable jaw, a vise stand, means to support said vise stand for rotation on said base member, means to hold said vise stand in adjusted position, a vise support on said vise stand, a splicing vise on said vise support, said splicing vise including a body having a fixed jaw and a movable jaw thereon, means to move the splicing vise movable jaw, and a cable loop engaging member shiftably mounted on the vise support adjacent to said splicing vise.

3. A cable splicing rig including a base member, an upright mounted on said base member and extending at right angles thereto, a gripping vise arm pivoted at one end on said upright and extending outwardly therefrom, means to support said arm in adjusted angular position relative to said upright, a fixed jaw member on said arm, a movable jaw member on said arm, means at the free end of the arm for operating the movable jaw, a table on said base member, a vise stand, means to mount said vise stand on said table for rotation about an axis parallel to said upright, means to hold said vise stand in adjusted angular position relative to said table, a vise support on said vise stand, a tube on said vise support, an operating rod slidable in said tube, a splicing vise on said vise support, said splicing vise including a body having a fixed jaw and a movable jaw thereon, means to move the splicing vise movable jaw, and a cable loop engaging member shiftably mounted on the vise support adjacent to said splicing vise.

4. A cable splicing rig including a base member, an upright mounted on said base member and extending at right angles thereto, a gripping vise arm pivoted on said upright and extending outwardly therefrom, means to support said arm in adjusted angular position relative to said upright, a fixed jaw member on said arm, a movable jaw member on said arm, means for operating the movable jaw, a table on said base member, a vise stand, means to mount said vise stand on said table for rotation about an axis parallel to said upright, means to hold said vise stand in adjusted angular position relative to said table, a vise support on said vise stand, a splicing vise on said vise support, said splicing vise including a body having a fixed jaw and a movable jaw thereon, means to move the splicing vise movable jaw, and a cable loop engaging member shiftably mounted on the vise support adjacent to said splicing vise.

LESLIE H. GARLINGHOUSE.